E. W. CLARK.
METHOD AND APPARATUS FOR REMOVING MOLTEN METAL FROM FURNACES.
APPLICATION FILED MAR. 23, 1918.
1,332,973.
Patented Mar. 9, 1920.
4 SHEETS—SHEET 1.
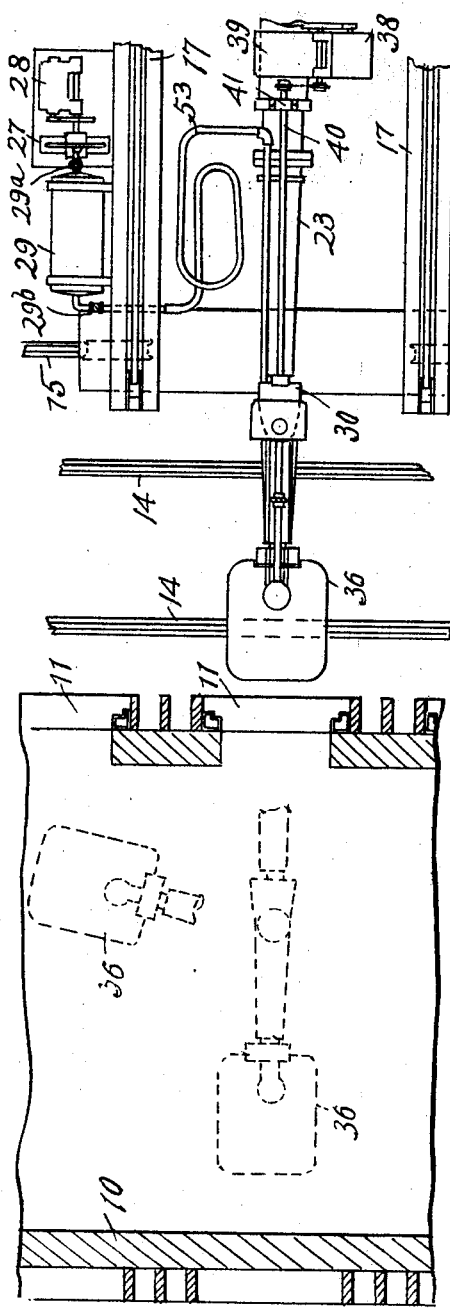
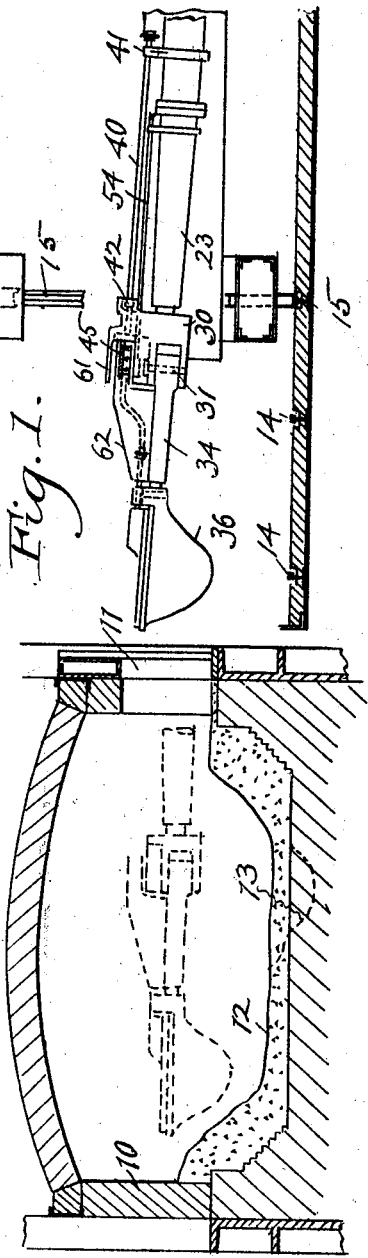
Inventor
Earl W. Clark
By Thurston & Knox
attys.

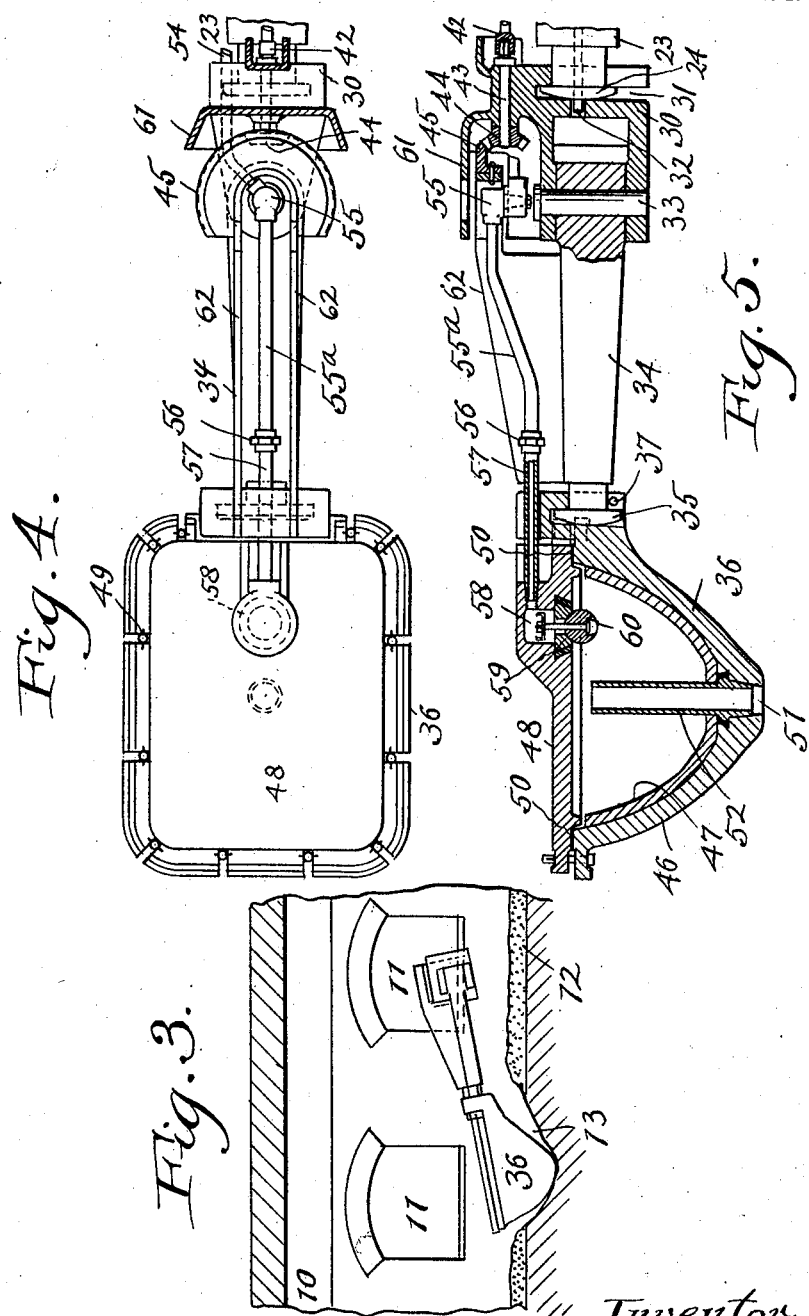

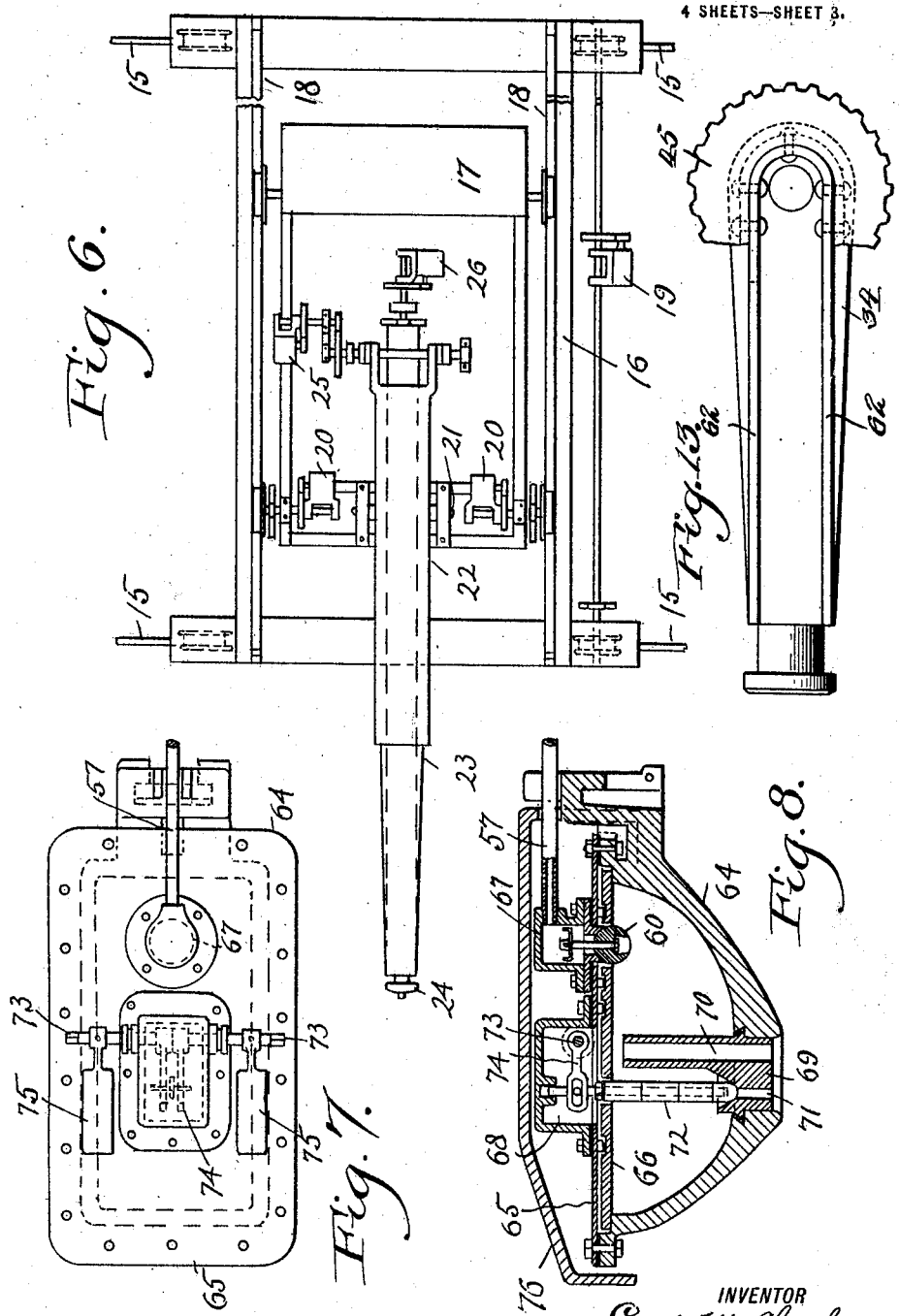

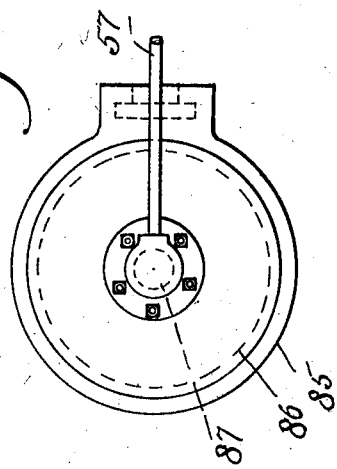
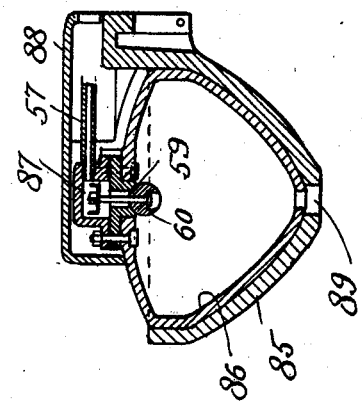
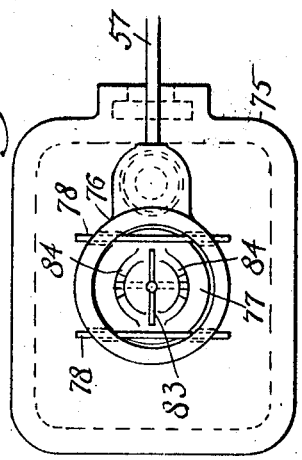
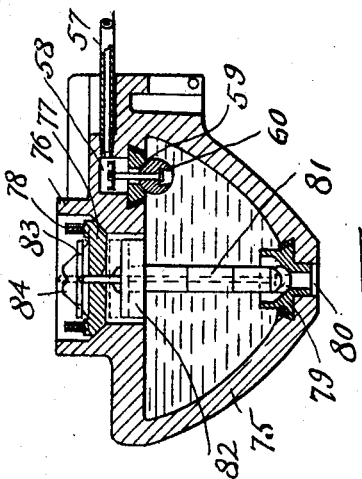

UNITED STATES PATENT OFFICE.

EARL W. CLARK, OF SHARON, PENNSYLVANIA.

METHOD AND APPARATUS FOR REMOVING MOLTEN METAL FROM FURNACES.

1,332,973.     Specification of Letters Patent.     Patented Mar. 9, 1920.

Application filed March 23, 1918. Serial No. 224,130.

*To all whom it may concern:*

Be it known that I, EARL W. CLARK, a citizen of the United States, residing at Sharon, in the county of Mercer and State of Pennsylvania, have invented a certain new and useful Improvement in Methods and Apparatus for Removing Molten Metal from Furnaces, of which the following is a full, clear, and exact description.

This invention relates to a method and to an apparatus for removing molten steel from holes in the bottoms of open hearth furnaces. It happens quite frequently, during the process of working a heat, that a hole will be formed in the bottom lining of the hearth. This hole is usually caused by the oxids or other impurities contained in the steel attacking or fluxing away the bottom lining and the rapidity of fluxing—designated in practice as "boiling on the bottom"—depends on the temperature of the steel at that point, and the impurities contained in the steel. The size of the holes usually formed varies from 18 in. to five or more feet across, and the depth of these holes varies from 4 in. to perhaps 18 in. at the deepest point.

After each heat is tapped any holes that may have formed in the bottom during the working of the heat must be as thoroughly cleaned of molten metal as possible, and then filled up again with lining material, and this materially firmly sintered or fused in place before the next heat can be charged.

Under the present practice the molten metal is removed from the hole by a rabble,—a tool shaped like an ordinary hoe. The metal is splashed out of the hole by the rabble, and eight to ten men are required to handle same. The process is exactly similar to the operation of splashing water out of a hole with an ordinary hoe.

About twenty to forty minutes are required to rabble out a hole and the metal splashed out is allowed to run out of the tap hole of the furnace and into the slag pit, where a very large percentage of the steel mixes in small particles with the slag and is wasted,—the steel being in such condition that much of it can not be recovered.

All of the metal can not be splashed out with the "rabble" and it is evident that a considerable quantity of steel will be left in the hole.

In order to make a good repair it is necessary that the material thrown in to fill up the hole must fuse down and combine with the bottom lining, and, evidently, where there is molten steel lying on the bottom a proper bond can not be made between the old lining and the new because the steel will float the new material thrown in and prevent proper bonding. It is evident that under these circumstances a hole will form again at this point after a few heats, and finally the hole may work down so far that a whole heat may go through the furnace bottom.

One of the objects of this invention is to provide a method and machine by which the rabbling or withdrawal of molten steel can be accomplished by mechanical means rather than by hand, and in such a manner that the molten metal can be removed from holes in the bottom much more thoroughly, thus enabling the furnace men to repair the bottom so that it will last much longer. Further, the invention aims to provide a machine that will remove the molten metal from holes in the bottom much more quickly than by hand labor, thus reducing the labor cost and increasing the output of the furnace by reducing the time that the furnace is idle. Again the invention aims to save all the metal that is taken out of the holes, thus effecting a direct saving where now there is a waste of steel. Furthermore, this invention aims, by enabling the furnace man to keep his furnace bottom in good condition, to shorten the time of heats by permitting him to run his furnace hotter without endangering the bottom, and in addition to avoid the formation of skull in the steel ladles by enabling the furnaceman to get his heat sufficiently hot before tapping.

The above and other objects are accomplished by my invention which contemplates the removing of the molten metal from the hole in the furnace bottom by suction, preferably by sucking the metal into a suitable ladle or receptacle which is inserted into the furnace and lowered into the metal to be removed.

My invention may be briefly summarized as consisting in certain novel details of construction and combinations and arrangements of parts which will be described in the specification and set forth in the appended claims.

In the accompanying sheets of drawings wherein I have shown apparatus which may be used advantageously in carrying out my invention, Figure 1 is a plan view of the major portion of the apparatus, omitting, however, the outer part of the charging machine, and showing also in horizontal section a portion of an open hearth furnace, the ladle and associated parts being shown by full lines before insertion in the furnace, and being shown by dotted lines in the furnace to illustrate the manner in which it may be manipulated; Fig. 2 is a view partly in side elevation and partly in vertical section of the same; Fig. 3 is a vertical sectional view of the interior of a portion of the furnace showing the ladle inserted in the hole in the bottom of the furnace and in the act of sucking the molten metal therein; Fig. 4 is a top plan view of one type of ladle which may be employed and some of the associated parts including the swinging arm or auxiliary peel designed to be supported at the forward end of the peel of the charging machine, parts being in section; Fig. 5 is a vertical sectional view of the same; Fig. 6 is a top plan view of a charging machine with the molten metal removing apparatus detached therefrom; Figs. 7 and 8 are respectively a top plan and a vertical sectional view of a modified form of ladle which may be used; Figs. 9 and 10 are similar views of another form of ladle; Figs. 11 and 12 are similar views of still another type of ladle, and Fig. 13 is a top plan view of one of the ladle supporting arms together with a gear segment attached thereto.

In the drawings, 10 represents an open hearth furnace with charging door openings 11 and with a bottom 12. In Figs. 2 and 3 I have indicated at 13 a hole or cavity such as frequently forms in the bottom of the furnace and from which the molten metal is withdrawn by the method and apparatus constituting the subject matter of this application.

A series of these furnaces are usually built in a row and directly in front of the row of furnaces is the charging track 14 on which is run small cars containing boxes of charging material. Just outside of or beyond the charging track 14 is a second track 15 for a charging machine with an arm or peel which picks up the boxes containing the charging material, inserts them in the furnace and tips or turns them so as to dump the contents onto the furnace floor.

I prefer to use a standard charging machine as a part of my improved apparatus for removing the molten metal from the cavity of the furnace bottom, and I am enabled to do this without affecting the utility of the machine for charging purposes by mounting on the frame the suction creating parts of the apparatus and by providing a ladle and movable ladle supporting arm which may be attached to the outer end of the peel in the same manner that the charging box is ordinarily attached thereto and which may be detached when the machine is to be used for charging purposes.

Before describing the construction and operation of the parts which are thus attached to the charging machine it may be well to first briefly describe the standard charging machine, a plan view of which is shown in Fig. 6, and portions of which are shown in other figures. This machine includes a wheeled frame 16 which runs along the track 15 previously described, and on this frame is mounted a carriage 17 which travels back and forth along a track 18 at right angles to the line of furnaces, the machine as a whole being propelled along the track 15 by one or more motors indicated conventionally at 19, and the carriage being moved back and forth on the frame of the machine by one or more motors such as shown at 20. Pivoted to turn about an axis 21 on the carriage is a housing 22 which projects forwardly from the carriage, the housing receiving the peel 23 at the forward end of which is a flanged portion 24 which ordinarily, or in the ordinary use of the machine, is received in and temporarily locked in a suitably formed part of the charging box but which in the same manner is designed to be connected to an arm or auxiliary peel which supports the ladle of the apparatus used in carrying out my invention. The housing and peel may be swung vertically about the axis 21 by a motor 25 and the peel may be turned about its longitudinal axis within the housing by a motor 26, this movement being ordinarily utilized to dump the contents from the charging box but may be made use of also to turn or swing the ladle as is indicated in Fig. 3.

Coming now to the parts which are applied to and which modify the charging machine to adapt it to the new use described, I mount on the charging machine, and preferably on the frame 16, a suction device preferably in the form of a vacuum pump 27 driven by a motor such as shown at 28 and preferably I provide on the suction side of the pump a so-called vacuum chamber in which a high degree of vacuum (so-called) is normally maintained. These parts may be permanently mounted on the frame 16. In the suction line on both sides of the chamber 29 I provide suitable valves such as shown at 29$^a$ and 29$^b$.

Additionally I provide certain parts which are designed to be detachably connected to the peel 23, and these include a ladle into which the molten metal is drawn by suction and which as previously stated, may assume different forms, together with the parts which directly support and connect the ladle to the peel. These supporting and connecting parts include a casting 30 having a slotted portion 31 which receives the flanged forward end 24 of the peel, and to which it is locked by the forward end of a locking rod 32 which extends centrally through the peel to the rear end thereof and which may be shifted axially by hand or otherwise. Swiveled or pivoted to this casting 30 by a pin 33 is an auxiliary peel or arm 34 which is capable of being swung in a manner hereinafter described horizontally with reference to the peel in order that the ladle may be moved about when inserted in the furnace to reach the cavity in the bottom of the furnace regardless of where the cavity may be located.

This pivoted arm has a flanged forward end 35 adapted to be detachably connected to the ladle which is designated 36 in Figs. 1 to 5. The ladle has a slotted part which receives the flanged end of the arm 34 and the same form of connection is made between the ladle 36 and the arm 34 as between the casting 30 and the peel 33 except in place of the longitudinally movable locking bolt or rod 32 a transverse locking pin 37 is employed.

The arm 34 and ladle 36 are swung by a motor which can be controlled by the operator on the machine. This motor which is shown at 38 and as here shown is mounted on the outer end of the housing 22 through a bracket 39, drives by means of reduction gearing a shaft 40 which has a bearing 41 on the housing near the bracket 39 and extends forwardly along the peel to near its forward end where it is connected by a coupling 42 (see Fig. 5) to a short shaft 43 mounted in the casting 30 and at its forward end carrying a bevel pinion 44 which meshes with a bevel gear segment 45 which is secured to the arm 34 co-axially with the pin 33 about which the arm 34 swings with reference to the casting 30. The gear segment 45 may be secured to the arm by attaching it to upstanding flanges or wings 62, with which the arm is preferably provided for a purpose to be subsequently explained, the connection between the segment and these flanges or wings being shown in Fig. 13. By this described mechanism the arm 34 and ladle 36 can be swung horizontally in either direction and to the extent desired by the operator to properly position the ladle over the cavity from which the metal is to be removed.

The ladle 36 of Figs. 1 to 5 includes a bowl-shaped body consisting of a metal shell 46 with a lining 47 of refractory material. The ladle body has a cover 48 designed to be clamped at intervals to the flanged top of the ladle body by clamping bolts 49, there being an intervening gasket 50 by which an airtight ladle is formed.

At the bottom of the ladle body is an inlet opening 51 for the molten metal, and inserted in this opening and extending toward the cover 48 is a tube 52 of refractory material up along which the molten metal is drawn by suction.

A partial vacuum is created in the ladle to a sufficient degree to suck the metal into the ladle, and this is accomplished through a pipe connection with the vacuum chamber 29 of the suction apparatus previously described.

This includes a flexible tube or pipe 53 which allows relative movement to take place between the peel and the suction apparatus. This flexible part of the suction line is connected to a pipe 54 which is supported on the peel and which at its forward end is connected to a swivel coupling 55 coaxial with the pin 33, this swivel coupling connecting the pipe 54 to a pipe section 55$^a$ which extends forwardly along the auxiliary peel and is connected through a union 56 to a short pipe section 57 which is carried by the cover of the ladle. This last mentioned pipe section leads to a recess or chamber 58 which is normally in open communication with the interior of the ladle. The swivel coupling 55 allows the relative movement to take place between the arm 34 and the peel, and the union 56 permits disconnection to be made in the suction line when it is desired to remove the ladle from the arm 34.

At the base of the air outlet recess 58 in the ladle cover is a valve seat 59 of refractory material, and a ball valve 60 of refractory material which will float on the molten steel is adapted to engage the seat, $i. e.$, to be lifted up into engagement with the seat so as to close the connection between the suction line and the ladle when the molten metal rises to a height in the ladle near the ladle cover. This insures against the flow of molten metal into the suction line. A hood 61 extends over the gearing 44, 45 and the swivel connection 55 in the suction line, and the arm or auxiliary peel 34 is provided with upstanding wings 62; these being provided to protect the parts against the direct action of the flames. Additionally if desired, the cover of the ladle may have a protecting hood such as shown for example in Fig. 8.

In the use of the apparatus the ladle will be inserted in the charging door of the furnace by running forwardly the carriage 17 on the track 18 and then the arm 34 will be swung or moved about in the manner previously described until the ladle is directly above the cavity from which the molten metal is to be removed,—then the ladle is lowered into the cavity by lowering the forward end of the peel or by turning it slightly as when the arm 34 is at a decided angle to the axis of the peel as in Fig. 3,—then the air is withdrawn from the ladle and a partial vacuum produced therein by the suction apparatus and suction line and this will cause the molten metal to be sucked into the ladle. When the ladle is filled it will be withdrawn from the furnace, placed on a car on the track 14, disconnected from the auxiliary peel or arm 34 and removed to a desired place where when the metal has solidified the cover will be removed and the metal will be withdrawn from the ladle.

In Figs. 7 to 12 I have shown modified forms of the ladle, the ladles of these figures differing from that first described chiefly in respect that the metal may be poured therefrom. And they differ also structurally in other respects.

The ladle of Figs. 7 and 8 includes a bowl-shaped body 64 to the flanged top of which is secured, with an intervening gasket, a cover 65 which is here shown as formed of relatively thin and somewhat flexible material so that it can be drawn down tightly to the ladle body in spite of any slight warping. Beneath the cover 65 is a sub-cover 66 which protects the cover 65 from the action of the heat of the molten metal.

At the top of the cover 65 is a hood or chamber 67 to which is connected the pipe section 57 of the suction line and which communicates with the interior of the ladle through the valve port and automatic shut-off valve 60 such as previously described. There is also a second hood or chamber 68 on the cover, this chamber inclosing certain stopper operating parts.

At the bottom of the ladle body 64 is a plug 69 having a metal inlet opening or passageway in an upstanding tube 70 and having also a pouring opening 71 for the molten metal. The pouring opening is normally closed by a stopper 72 consisting preferably of a rod surrounded by sleeves of refractory material and having its upper end extending up into the chamber 68. This stopper 72 is designed to be operated by a rod or shaft 73 which extends transversely through the walls of chamber 68 through suitable bushings which will form air-tight openings. This shaft has arms 74 with a pin and slot connection with the stopper so that when the shaft 73 is rotated the stopper will be raised or lowered and the shaft 73 has weights 75 which normally maintain the stopper in closing position. Additionally this ladle may be provided at the top with a shield or hood 76, shown in Fig. 8, this shield serving to protect all parts of the top of the ladle from the action of the flames in the furnace. This ladle has provision for attachment to the auxiliary arm or peel in the same manner previously described.

This ladle will be filled with the molten metal in the same manner previously described and will then be withdrawn from the furnace and the metal will be poured into a suitable mold supported on a car of the charging track. To do this the operator simply has to lift the stopper 72 by turning the rod or shaft 73. This stopper operating shaft can be turned by applying a suitable tool to one end of the rod 73 and this can be done through an opening in the top shield 76 without removing the latter.

The ladle of Figs. 9 and 10 differs from that just described principally in the respect that the metal is poured from the ladle through the inlet or suction opening. This ladle consists of a suitable body 75 with a central upstanding hood in the form of a flange 76 which incloses and seats a removable relatively small cover 77 which can be held in place by transverse wedges 78 passing through the upstanding flange 76. At the bottom of the ladle is a plug 79 having a combined suction inlet and pouring opening 80, adapted to be closed by a vertically movable stopper 81 having near the top a weight 82 to overcome the buoyancy of the metal. This stopper preferably consists of a central rod surrounded by sleeves of refractory material, the upper part of the rod extending through a central opening in the cover 77 and provided at the top with a short cross rod 83 adapted to lie between two upstanding ribs or flanges 84 in which event the stopper will be in lowered position, but if the stopper is elevated and turned ninety degrees so that the upper end 83 extends across or over the top of the flanges 84 the stopper will be held in elevated position. This ladle will be connected with the auxiliary peel and a partial vacuum will be created as with the ladles previously described.

In the use of this ladle, it will be inserted in the furnace with the stopper elevated, and when the metal has been drawn into the ladle by suction to a predetermined height determined by the shut-off valve 60 the operator with a suitable rod inserted in the furnace door will engage and turn the upper cross member 83 of the stopper and allow the stopper to drop to closed position, after which the ladle will be removed from the furnace, the stopper will be elevated and the metal poured into a mold.

The ladle in Figs. 11 and 12 includes a protecting shell 85 with an inner part 86 of refractory material. The suction pipe 57 of the suction line is connected to a chamber 87 at the central top part of the ladle, this chamber communicating with the ladle through the shut-off valve 60 such as utilized with the other ladles, there being preferably provided at the top a protecting hood 88 which is shown in Fig. 12 but not in Fig. 11. At the bottom of the ladle is a combined suction inlet and outlet opening 89 for the molten metal. No stopper is provided for this opening and suction alone is relied on to hold the metal in the ladle after it has been filled.

A ladle of this design is adapted particularly for simply conveying the molten metal from the cavity to the tap-hole of the furnace, it being thought desirable to use ladles having means for positively retaining or holding the metal in the ladle when the molten metal is to be carried out through the charging door and then poured or otherwise disposed of.

While I have shown ladles of certain types and constructions it will be obvious that other forms will suggest themselves to one skilled in the art, and I therefore do not desire to have it understood that I regard my invention as limited in its use to the ladles specifically shown and described.

While I realize also that various changes may be made in the supporting and operating mechanism for the ladle it is important that this mechanism have substantially the described movements that the specific mechanism herein shown and described possesses or is capable of receiving, or the equivalent of the same, in order that the ladle may be made to reach and be lowered into a cavity regardless in what part of the furnace bottom the cavity is located.

In the use of the apparatus simply two operators are required, one serving as an observer and the other being stationed on the machine and manipulating the ladle through the various controlling motors, it being understood that all movements and all steps of the method are controlled from the outside of the furnace by the operator on the machine. The wiring and controlling devices are omitted for the sake of clearness and to avoid showing unnecessary parts.

It will be understood without further description of the method of operation, that, with my method and apparatus a furnace can be rabbled with a less number of operators, in less time, more effectively, and with a far less waste of steel than with the old method and that therefore the various objects stated at the beginning of the specification are attained.

Having described my invention, I claim:

1. In an apparatus for removing molten metal from a furnace, a ladle, and means for supporting the ladle so that it may be moved about in a furnace comprising a plurality of relatively movable arms, one of which is connected to the ladle.

2. In an apparatus for removing molten metal from a furnace, a ladle, and means for supporting the ladle so that it may be moved about in a furnace comprising a plurality of relatively movable arms, one of which is connected to the ladle, and a suction line extending along said arms.

3. In an apparatus for removing molten metal from a furnace, a ladle, and means for supporting the ladle so that it may be moved about in a furnace comprising a plurality of relatively movable arms, one of which is connected to the ladle, and means extending along one of the arms for shifting the arm which is connected to the ladle.

4. In an apparatus for removing molten metal from a cavity in the bottom of a furnace, a member adapted to be moved about on the exterior of the furnace, a ladle, means for supporting the ladle from said member so that the ladle may be inserted in the furnace, moved laterally and downwardly therein, and means for producing partial vacuum in the ladle.

5. An apparatus for withdrawing molten metal from a cavity in the bottom of a furnace, a member adapted to be moved about on the exterior of the furnace, a closed ladle having an opening for the admission of molten metal, means for supporting the ladle from said member so that the ladle may be inserted in the furnace, raised and lowered and swung laterally so that it may be lowered in the cavity regardless of its location in the bottom of the furnace, and means for producing a partial vacuum in the ladle.

6. In an apparatus for withdrawing molten metal from a furnace by means of suction, the combination of a member adapted to be moved about on the exterior of the furnace, a ladle having an inlet opening for molten metal, means for supporting the ladle from said member so that it may be inserted in the furnace, moved about therein and lowered into a cavity in the bottom of the furnace, said means comprising an arm mounted on said member and an arm pivoted to said first-named arm, said second arm being connected to the ladle, and means for forming a partial vacuum in the ladle.

7. In an apparatus for withdrawing molten metal from a furnace by means of suction, a member adapted to be moved about on the exterior of the furnace, a ladle having an inlet opening for metal, means for producing a partial vacuum in the ladle, and means for supporting the ladle from said member, said supporting means comprising an arm pivoted on said member to swing about a substantially horizontal axis, and an arm pivoted to the first-named arm to swing about a substantially vertical axis, the said second arm being connected to the ladle.

8. In an apparatus for withdrawing molten metal from a furnace, a ladle adapted to be inserted in the furnace, means for producing a partial vacuum therein, and means for supporting the ladle comprising a main-supporting device, an arm mounted on said device for movement toward and from the furnace and for swinging movement about a substantially horizontal axis, and a second arm connected to the ladle and pivotally connected to said first-named arm to turn about a substantially vertical axis.

9. In an apparatus for withdrawing molten metal from a furnace, a supporting member movable about on the exterior of the furnace, a ladle adapted to be inserted in a furnace, means for producing a partial vacuum in the ladle, and means for connecting the ladle to said member said means comprising an arm mounted on said member to turn about its longitudinal axis and to swing about a substantially horizontal axis, and a connection between said arm and the ladle.

10. In an apparatus for withdrawing molten metal from a furnace, the combination of a supporting member movable about on the exterior of the furnace, a ladle adapted to be inserted in the furnace, and means for connecting the ladle to said member, said means comprising an arm mounted on said member to turn about its longitudinal axis and to swing about a substantially horizontal axis, and a second arm pivoted to the first-named arm and connected to the ladle.

11. In an apparatus for withdrawing molten metal from a furnace, a supporting member movable about on the exterior of the furnace, a ladle adapted to be inserted in a furnace, and means for connecting the ladle to the supporting member, said means comprising an arm mounted on the supporting member to turn about its longitudinal axis and to swing about a substantially horizontal axis, and a second arm pivotally connected to the first-named arm to turn about a substanstantially vertical axis, said second-named arm being connected to the ladle.

12. In an apparatus for withdrawing molten metal from a furnace by means of suction, a frame adapted to be moved about on the exterior of the furnace, a carriage movable toward and from the furnace, a housing supported by the carriage for movement about a substantially horizontal axis, an arm supported in said housing, a second arm pivoted to the first-named arm to turn about a substantially vertical axis, and a ladle supported on said second arm.

13. In an apparatus for withdrawing molten metal from a furnace by means of suction, the combination of a frame adapted to be moved about on the exterior of the furnace, a carriage mounted on the frame and movable toward and from the furnace, a housing mounted on the carriage to turn about a substantially horizontal axis, an arm mounted in said housing to turn about its longitudinal axis, a second arm pivoted to said first-named arm to turn about a substantially vertical axis, a ladle supported on said second-named arm, and means for producing a partial vacuum in the ladle.

14. In an apparatus for withdrawing molten metal from a cavity in the bottom of a furnace, a ladle having an opening for the inflow of metal, means for producing a partial vacuum in the ladle, means for movably supporting the ladle comprising an arm adapted to be inserted in the charging door of the furnace, a second arm movably supported on the first and in turn supporting the ladle, and means whereby the second arm and ladle may be moved about in the furnace and controlled from a point outside the furnace.

15. In an apparatus for removing molten metal from the cavity in the hearth line of a furnace, a ladle having an opening for the inflow of metal, means for producing a partial vacuum in the ladle and means for supporting and controlling the ladle so that it may be moved about in the furnace and then lowered in the cavity, said means comprising an arm movable toward and from the furnace and adapted to be raised and lowered, and a second arm pivoted to the first.

16. In an apparatus for withdrawing molten metal from the cavity in the hearth line of a furnace, a ladle having an opening through which molten metal is adapted to be drawn by suction, means for supporting the ladle comprising a movable arm, a second arm pivotally connected to said first-named arm and at its forward end detachably connected to the ladle, movement controlling mechanism extending along the first-named arm to the second arm, and a suction line extending along the second-named arm to the ladle.

17. In an apparatus for withdrawing molten metal from a cavity in the bottom of a furnace, a ladle having an opening through which molten metal is adapted to be drawn by suction, a support for the ladle including an outer arm adapted to be inserted in the furnace, a second arm mounted on the first to turn about an axis and connected to the ladle, means controllable from the exterior of the furnace for shifting the second arm including a part having its axis coincident with the axis of movement of the second arm.

18. In an apparatus for withdrawing molten metal from a cavity in the bottom of a furnace, a ladle having an opening through which molten metal is adapted to be drawn by suction, a support for the ladle including an outer arm adapted to be inserted in the furnace, a second arm mounted on the first to turn about an axis and connected to the ladle, means controllable from the exterior of the furnace for shifting the second arm including a part having its axis coincident with the axis of movement of the second arm, and a suction line extending to the ladle and including a coupling whose axis is coincident with the axis of movement of said second arm.

19. In an apparatus for withdrawing molten metal from a cavity in the hearth line of a furnace, a ladle, a support for the ladle adapted to be extended into the furnace, a suction line extending to the ladle, and a shut-off valve in the ladle for closing the suction line when the metal reaches a predetermined height in the ladle.

20. In an apparatus for withdrawing molten metal from a cavity in the bottom of a furnace, a frame, suction apparatus supported on the frame, a ladle adapted to be inserted in the furnace and moved about therein, means for supporting the ladle from the frame including a plurality of relatively movable parts movably supported on the frame, means for controlling movement of the ladle and said parts from the exterior of the furnace, a suction line extending from the suction apparatus to the ladle, and means for automatically closing the suction line when the metal reaches a predetermined height in the ladle.

In testimony whereof, I hereunto affix my signature.

EARL W. CLARK.

Witnesses:
CHAS. L. SMITH,
WILLIAM STILLINGS.